Patented Mar. 16, 1937

2,074,040

UNITED STATES PATENT OFFICE 2,074,040

ARYL MERCURY HYDROXY MONONUCLEAR AROMATIC CARBOXYLATES

Carl N. Andersen, Wellesley Hills, Mass., assignor to Lever Brothers Company, a corporation of Maine No Drawing. Application February 4, 1936, Serial No. 62,275

14 Claims. (Cl. 260—13)

The present invention relates to the production of aromatic mercury salts of hydroxy substituted mononuclear aromatic acids.

It is an object of my invention to produce new organic mercury compounds useful as germicides and for other therapeutic purposes.

I have discovered that when the hydrogen atom of the acidic group or groups of hydroxy substituted mononuclear aromatic acids is replaced by the essential radical of certain aromatic mercury compounds, compounds are produced which have extraordinarily high potency as antiseptics and germicides, and at the same time are characterized by relatively low toxicity and other desirable properties.

The compounds I have produced may be described as having the general formula $(RHg)_x \cdot R_1$, in which R represents an aromatic structure to a carbon atom of which the mercury is directly attached; in which $R_1$ represents a hydroxy substituted mononuclear aromatic acid radical that is linked to the RHg group or groups through the replacement of the hydrogen atom of the acidic group or groups; and in which $x$ represents the number of RHg groups attached to the acid radical. While the word "group" is used hereinafter, it is obvious that it must be interpreted as plural when more than one RHg group is attached to the acid radical.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as, for example, mono or polycyclic hydrocarbons in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to a mononuclear aromatic compound which contains one or more acidic groups, and in which one or more of the hydrogens attached to nuclear carbon atoms have been substituted by a hydroxy group. The mononuclear compound may be a derivative of benzene and its homologues, for example toluene and xylene. More than one hydroxy group may be substituted in a compound and more than one of the hydrogens of the ring may be replaced by one or more hydroxy group and some other atom or group, for example, any monovalent radical.

The following examples illustrate the types of acids and acid derivatives falling within the above defined class, and from which organic mercury salts of the type heretofore defined may be prepared; salicylic acid, p-hydroxy benzoic acid, m-hydroxy benzoic acid, protocatechuic acid, gallic acid, b-resorcylic acid, syringic acid, cresotinic acids, 3-hydroxy o-phthalic acid anhydride, 3,4-dihydroxy phthalic acid anhydride, hydroxy trimesic acid, and hydroxy mesitylinic acid.

In the case of the anhydride and other acid derivatives, the reaction is slightly different, as will be pointed out in more detail hereinafter.

The compounds I have prepared, together with others I have investigated, comprise a sufficiently representative number of the hydroxy substituted mononuclear aromatic acids to lead me to believe that all of the acids of this general group may be employed to produce my novel mercury compounds. The compounds so prepared have in greater or lesser degree, but always in a relatively high degree, antiseptic and germicide properties. I, therefore, regard my invention generic to and including the entire group of hydroxy substituted mononuclear aromatic acids of the above defined type.

The general method of producing these compounds consists in reacting together a hydroxy substituted mononuclear aromatic acid and a compound containing an aromatic mercury radical of the above defined type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a general method of preparing aromatic mercury compounds of this type by reacting the acidic compound with an aromatic mercury hydroxide. This reaction is one of neutralization of an acid and a base to form a salt and water. This has the advantage that water is the only other product produced and the resulting compound may be easily purified. In my application Serial No. 694,199, filed October 18, 1933, I have disclosed another general method of preparing aromatic mercury compounds of this type by employing a soluble aromatic mercury salt, for example, the acetate or the lactate, in a reaction with the acidic compound. The aromatic mercury compounds produced are of a relatively low solubility as compared with the aromatic mercury salts and are relatively insoluble as compared with the acidic compound. In my application Serial No. 50,001 filed November 15, 1935, I have disclosed a method of preparing aromatic mercury compounds by reacting an acid derivative, such as an ester or anhydride with an aromatic mercury hydroxide to form the corresponding aromatic mercury salt. Any of these general methods may be employed in producing compounds comprising this invention.

The following examples are given as illustrative of a method by which all of the compounds comprising this invention may be prepared and as illustrative of representative organic mercury derivatives falling within the scope of my invention:

Example 1

2.94 grams of phenylmercury hydroxide is dissolved in 1 liter of water. The solution is filtered to remove any gum or insoluble material. To the filtrate is added 1.51 grams of salicylic acid dissolved in 100 cc. of water, and the mixture is allowed to cool and stand until precipitation is complete. The precipitate is separated by filtration, washed thoroughly and then dried. The resulting product is a white crystalline substance sparingly soluble in water, melting at 158–163° C., and is the compound phenylmercury salicylate.

Example 2

17.64 grams of phenylmercury hydroxide is dissolved in 4 liters of water and heated until solution is complete. The solution is filtered to remove any insoluble material. To the filtrate is added 8.28 grams of p-hydroxy benzoic acid. A precipitate results and the mixture is allowed to cool after which the precipitate is separated by filtration, washed well with warm water and dried. The material has a melting point of 199° C., and is the compound phenylmercury p-hydroxy benzoate.

Example 3

88.8 grams of p-diphenylmercury hydroxide is dissolved or suspended in 4 liters of alcohol. To this solution is added 33.12 grams of salicylic acid dissolved in 100 cc. of alcohol. A granular precipitate results immediately which is separated by filtration, washed with alcohol and dried. A further amount of the material may be separated by cooling the mother liquor. The material sinters at 185° C. and melts at 191° C. with effervescence, and is the compound p-diphenylmercury salicylate.

Example 4

20 grams of phenylmercury acetate is dissolved in 2 liters of water and heated until the solution is complete. The solution is filtered to remove any insoluble material. To the filtrate is added an alcoholic solution containing 9.12 grams of o-cresotinic (2-hydroxy, 1-methyl, 3-benzoic acid) acid. A precipitate results and the mixture is allowed to cool after which it is filtered. The precipitate is washed well with warm water and alcohol and dried. It has a melting point of 107–108° C., and is the compound phenylmercury o-cresotinate.

Example 5

17.64 grams of phenylmercury hydroxide is dissolved in 4 liters of water and heated until solution is complete. The solution is filtered to remove any insoluble material. To the filtrate is added 10.16 grams of b-resorcylic acid dissolved in 300 cc. of water. A white precipitate results and the mixture is allowed to cool after which it is filtered. The precipitate is washed well with warm water and allowed to dry. It has a melting point of 154–155° C., and is the compound phenylmercury b-rescorcylate.

Example 6

17.64 phenylmercury hydroxide is dissolved in 4 liters of water and heated until the solution is complete. The solution is filtered to remove any insoluble material. To the filtrate is added an aqueous solution containing 12.4 grams of gallic acid. A greenish yellow precipitate results and the mixture is allowed to stand in the dark. The precipitate is separated by filtration, washed well with warm water and dried. Upon further heating of the material, the green color increases and the material decomposes. It is the compound phenylmercury gallate.

From the description in the above examples, it will be readily apparent to one skilled in the art how other members of the above defined group, for example, the polybasic acids, may be reacted with an aromatic mercury compound to produce the other mercury compounds which are within the scope of my invention.

The reacting materials are employed in substantially theoretical quantities. In some cases, if desired, approximately 10% excess of the acid or acid derivative may be employed in order to insure a complete conversion of the aromatic mercury compound.

Any suitable solvent in which the reacting components are soluble may be used as the medium for carrying out the reaction. If they are both soluble in water this is generally used for reasons of convenience, but if not, other solvents such as the alcohols or acetone or mixtures of these with each other or with water, may be employed.

The process may be carried out at any temperature, for example, room temperature. In most cases I find, however, that the use of heat facilitates the solution of the reaction components and speeds the reaction.

The compounds produced as above described are characterized by extraordinarily high potency as antiseptics and germicides. Tests to determine the efficacy of some of them in killing *B. typhosus* and *Staph. aureus* were carried out under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A method against *Eberthella typhi* (typhoid bacillus) at 37° C. and F. D. A. special method against *Staph. aureus* at 37° C.

As illustrative of the potency of the compounds, the killing power of the following compounds is given merely for illustration.

The figures represent the maximum dilutions at which killing in 15 minutes resulted:

|  | B. typhosus | Staph. aureus |
|---|---|---|
| Phenylmercury salicylate | 1:70,000 | 1:30,000 |
| Phenylmercury p-hydroxy benzoate | 1:50,000 | 1:40,000 |
| Phenylmercury o-cresotinate | 1:80,000 | 1:40,000 |
| Phenylmercury protocatechuate |  | 1:40,000 |

In addition to their high germicidal value, all of these compounds are characterized by relatively low toxicity. Because of these properties it is possible to use them in extreme dilutions and in many suitations where known germicides, because of toxic or other undesirable properties, cannot be employed. They may be used externally and locally on human beings and higher animals and in some cases administered internally with satisfactory results from the germicidal standpoint and without harmful effect to the body or its functions. The salicylate, for example, is characterized by its penetration and killing power even in the presence of extraneous organic matter. It may be injected intravenously and peritoneally with highly satisfactory results.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

This application is a continuation in part of my copending application Serial No. 694,207, filed October 18, 1933.

I claim:

1. A new organic mercury compound having the general formula $(RHg)_x \cdot R_1$, in which R represents an aromatic structure to a carbon atom of which the mercury is directly attached, and in which none of the carbon atoms has direct linkage with any element other than hydrogen, carbon and mercury; in which $R_1$ represents a hydroxy substituted mononuclear aromatic acid radical, which is linked to the RHg group through the replacement of acidic hydrogen; and in which $x$ represents the number of RHg groups attached to the acid radical, and is an integer representating the number of acidic hydrogens in the acid.

2. A new organic mercury compound having the general formula $RHg \cdot R_1$, in which R represents an aromatic structure to a carbon atom of which the mercury is directly attached, and in which none of the carbon atoms has direct linkage with any element other than hydrogen, carbon and mercury; and in which $R_1$ represents a hydroxy substituted mononuclear monobasic aromatic acid radical, which is linked to the RHg group through the replacement of the acidic hydrogen atom.

3. A new organic mercury compound having the general formula $RHg \cdot R_1$, in which R represents an aromatic structure to a carbon atom of which the mercury is directly attached, and in which none of the carbon atoms has direct linkage with any element other than hydrogen, carbon and mercury; and in which $R_1$ represents a hydroxy substituted benzoic acid radical, which is linked to the RHg group through the replacement of the acidic hydrogen atom.

4. A new organic mercury compound having the general formula $RHg \cdot R_1$, in which R represents an aromatic structure to a carbon atom of which the mercury is directly attached, and in which none of the carbon atoms has direct linkage with any element other than hydrogen, carbon and mercury; and in which $R_1$ represents a monohydroxy substituted benzoic acid radical, which is linked to the RHg group through the replacement of the acidic hydrogen atom.

5. A new organic mercury compound having the general formula $RHg \cdot R_1$, in which R represents an aromatic structure to a carbon atom of which the mercury is directly attached, and in which none of the carbon atoms has direct linkage with any element other than hydrogen, carbon and mercury; and in which $R_1$ represents a polyhydroxy substituted benzoic acid radical, which is linked to the RHg group through the replacement of the acidic hydrogen atom.

6. A new organic mercury compound having the general formula $RHg \cdot R_1$, in which R represents an aromatic structure to a carbon atom of which the mercury is directly attached, and in which none of the carbon atoms has direct linkage with any element other than hydrogen, carbon and mercury; and in which $R_1$ represents a salicylic acid radical that is linked to the RHg group through the replacement of the acidic hydrogen atom.

7. A new organic mercury compound having the general formula $(C_6H_5Hg)_x \cdot R_1$, in which $R_1$ represents a hydroxy substituted mononuclear aromatic acid radical which is linked to the $C_6H_5Hg$ group through the replacement of acidic hydrogen; and in which $x$ represents the number of $C_6H_5Hg$ groups attached to the acid radical, and is an integer representing the number of acidic hydrogens in the acid.

8. A new organic mercury compound having the general formula $C_6H_5Hg \cdot R_1$, in which $R_1$ represents a hydroxy substituted mononuclear monobasic aromatic acid radical, which is linked to the $C_6H_5Hg$ group through the replacement of the acidic hydrogen atom.

9. A new organic mercury compound having the general formula $C_6H_5Hg \cdot R_1$, in which $R_1$ represents a hydroxy substituted benzoic acid radical, which is linked to the $C_6H_5Hg$ group through the replacement of the acidic hydrogen atom.

10. A new organic mercury compound having the general formula $C_6H_5Hg \cdot R_1$, in which $R_1$ represents a monohydroxy substituted benzoic acid radical, which is linked to the $C_6H_5Hg$ group through the replacement of the acidic hydrogen atom.

11. A new organic mercury compound having the general formula $C_6H_5Hg \cdot R_1$, in which $R_1$ represents a polyhydroxy substituted benzoic acid radical, which is linked to the $C_6H_5Hg$ group through the replacement of the acidic hydrogen atom.

12. Phenylmercury salicylate.
13. Phenylmercury gallate.
14. Phenylmercury protocatechuate.

CARL N. ANDERSEN.